United States Patent [19]

Hubbard et al.

[11] 4,249,365
[45] Feb. 10, 1981

[54] COTTON HARVESTER

[75] Inventors: Arthur L. Hubbard; Russell D. Copley; Merle D. Nieman, all of Ankeny, Iowa

[73] Assignee: Deere & Company, Moline, Ill.

[21] Appl. No.: 100,317

[22] Filed: Dec. 5, 1979

[51] Int. Cl.³ ............................................. A01D 45/18
[52] U.S. Cl. ..................................... 56/13.2; 56/13.3; 56/28
[58] Field of Search ................... 56/12.1, 14.2, 28, 30, 56/41, 13.2, 13.3

[56] References Cited

U.S. PATENT DOCUMENTS

| 2,803,938 | 8/1957 | Thomann | 56/41 |
|---|---|---|---|
| 3,031,828 | 5/1962 | Graham | 56/11.9 |
| 3,088,262 | 5/1963 | Graham | 56/41 |
| 3,176,451 | 4/1965 | Hubbard | 56/13.2 |
| 3,352,092 | 11/1967 | Hubbard | 56/13.2 |
| 3,373,547 | 3/1968 | Hubbard | 56/44 |
| 3,387,437 | 6/1968 | Owen | 56/13.2 |
| 3,464,191 | 9/1969 | Copley et al. | 56/13.3 |

Primary Examiner—Paul J. Hirsch

[57] ABSTRACT

A support arrangement and discharge structure for individual picking units of a four-row cotton picker. The outboard picking units are transversely cantilevered from the inboard units using telescoping cross members which are adjustable to properly position the units for various row spacings. The cross members are tied between upper rigid beam structure on adjacent inboard and outboard units, the structure including an upper plate, cam support and transverse and fore-and-aft stiffeners. Each outboard unit includes a diagonal brace connected to the rigid beam structure to absorb fore-and-aft loading and thereby eliminate need for a lower stabilizer. Two high volume picker drums on adjacent inboard and outboard units are serviced by a single discharge structure supported from the inboard unit and connected to a single cotton conveying duct. A hinged baffle plate extends rearwardly from the outboard unit to the discharge structure, and pivots to permit the units to be adjusted with respect to each other.

51 Claims, 14 Drawing Figures

COTTON HARVESTER

BACKGROUND OF THE INVENTION

This invention relates to a cotton harvester and more specifically to the support arrangement and discharge structure for individual row units of the harvester.

Conventional cotton harvesters of the type shown, for example, in U.S. Pat. Nos. 3,373,547, 3,378,309, 3,464,191 and 3,515,437 utilizing individual row units with vertical picker drums and doffer assemblies have for the most part been limited to harvesting two rows at a time. Each row unit is relatively heavy, and adequately supporting more than two units while maintaining a narrow chassis and keeping the proper wheel spacing in relation to the rows of cotton has been a continuing source of difficulty. Each picking unit includes two picker drums with numerous picker bars mounting a plurality of gear-driven spindles for removing cotton from the plant. In addition, a doffer assembly with numerous doffer pads is provided for each picker drum to remove the cotton from the spindles. Although the weight of the components has been reduced by using lighter materials and smaller sizes, the individual units are still relatively heavy and put a considerable amount of mass in motion during operation thereby necessitating a sturdy support structure.

Typical of previous self-propelled two-row cotton pickers, the individual row units are supported forwardly of and between transversely spaced drive wheels by inner and outer lift arms connected to a transverse rock shaft near the forward end of the harvester frame. The row units include a housing having a sheet and panel construction of the type shown in U.S. Pat. No. 2,803,938. The housing has an upper box-like structure from which depend a pair of compartments each containing a picking drum and associated mechanism. Stabilizer bars extend from the harvester frame between the wheels to the lower rear of each compartment of the picking units for fore-and-aft support to prevent the unit from collapsing if it strikes an obstruction or is grounded, and also for adjusting the front to rear slope of the units. To add outboard units to increase capacity from two to four rows without widening the frame has heretofore been a problem since there has been no practical way to support and provide stabilization for the outboard units. Previous designs for a four-row harvester included transverse horizontal beams mounted at the rear of the main frame and carrying rock shaft and lower support braces for supporting the outboard picking units outwardly of and behind the forward wheels. Such a harvester is described in U.S. Pat. No. 3,176,451. Rear-mounted units are difficult for the operator to view, and the horizontal beams widen the rear of the main frame making the harvester harder to maneuver. The widened rear end adds too much weight to the rear steering wheels and also prevents a cotton receiver from being moved in closely to the basket during dumping.

In another four-row harvester, described in U.S. Pat. No. 3,031,828, a pair of unitary housing structures, each carrying two picking units, are mounted on opposite sides of the center line of the harvester. A pair of upper lift arms connected to a rock shaft and a lower stabilizer inside the drive wheels support each housing on the frame. The unitary housing structure is heavy and difficult to assemble and mount. The gears that drive the four picker drums often become misaligned as the large housing twists or bends slightly. Adjusting the units for varying row widths is not possible, and servicing the picker drums and doffers is difficult because of the unitary structure. The four-row harvesters typical of the prior art present problems during transportation because of their width. Narrowing the harvesters for transport is very time consuming and requires large equipment particularly when a unitary two-row housing structure is utilized.

It is known to provide a single compartment rearwardly of the housing structure that is adapted to receive cotton from a pair of upright harvesting drums that are positioned inwardly of a pair of adjacent rows of cotton plants. Such a housing is shown, for example, in U.S. Pat. No. 3,464,191. Doffing mechanisms associated with each of the drums removes the cotton from the spindles on the drums and discharge it rearwardly to the compartment through openings in the housing. An air duct then sucks the cotton from the compartment and conveys it upwardly to a basket on the harvester. Forwardly of the first harvesting drums are a second pair of harvesting drums located outwardly of the adjacent rows of parallel cotton plants, such as shown in U.S. Pat. No. 3,088,262. Commonly, a side compartment associated with each of the forward drums is provided for receiving cotton from the doffing mechanisms. The spindles on the forward drums are the first to contact the rows of cotton plants and therefore remove a higher volume of the cotton from the plants than do the spindles on the rear drums. The side compartments, which must be of adequate size to receive the high volume of cotton from the harvesting area, extend outwardly from the units thereby widening the front of the cotton harvester. The side compartments decrease maneuverability and prevent mounting of additional harvesting units to increase cotton harvester capacity to greater than two rows. Moving the compartments rearwardly of the harvesting unit results in the units extending too far forwardly on the harvester frame, and making the harvester front heavy.

In the aforementioned U.S. Pat. No. 3,031,828, there is shown a four-row cotton harvester in which a rear wall structure in the unitary housing structure receives cotton doffed from a pair of forward harvesting drums. Side compartments for receiving doffed cotton are eliminated, but assembly of the harvester and servicing of the doffers and drums are very difficult because of the structure. To service the doffers and the drums on such a harvester, the operator often has to crawl under or on top of the compartment.

BRIEF SUMMARY OF THE INVENTION

It is therefore an object of the present invention to provide an improved cotton harvester which eliminates the aforementioned disadvantages.

It is still another object of the invention to provide an improved support arrangement and discharge structure for individual row units of a cotton harvester.

It is still another object of the invention to provide a means for mounting a plurality of individual harvesting units on a row crop harvester, wherein the outermost harvesting units are supported entirely from the adjacent inner units and are adjustable with respect thereto. It is still another object to provide such a means for mounting a plurality of harvesting units wherein the outermost units do not require a stabilizer or similar device extending from the lower part of the harvester frame to the lower part of the harvesting unit.

It is a further object to provide a cotton harvester in which the outermost harvesting units are adjustable with respect to and removable from the inner units. It is another object to provide such a harvester with a common discharge structure which services two forward picker drums on adjacent inner and outer units to reduce the number of cotton conveying ducts required, and which permits the adjacent units to be easily assembled and transversely adjusted with respect to each other.

It is still another object of the invention to provide an improved discharge structure which permits convenient access to the picker drums and the doffer assemblies.

A pair of individual harvesting units are supported near the forward end of a main frame for independent vertical adjustment with respect thereto by lift arms connected to a pair of rock shafts. Each unit has lower stabilizing bars connected thereto for absorbing fore-and-aft loading and adjusting the angle of attack. Each inboard harvesting unit has an outboard harvesting unit transversely mounted thereon in cantilever fashion by an adjustable tie assembly. The outboard unit can be adjusted with respect to the inboard unit to accommodate different row spacings. In addition, the outboard unit can be easily removed for narrowing the harvester during shipping or to provide access to the inner unit for servicing. Each outboard unit includes a diagonal brace for absorbing fore-and-aft loading and eliminating the need for a lower stabilizing bar. The adjustable tie assembly features upper telescoping cross members connected to the upper box-like structure of each of the adjacent units. One end of the diagonal brace is connected to the upper box-like structure and the opposite end to the forward part of a floor panel so that if the unit is run into the ground, it will not collapse for lack of a lower stabilizer but will be held solidly by the rigid upper structure. The two inboard harvesting units accommodate two rows between the traction wheels of the implement while the outboard units each accommodate a single row adjacent the outside edge of the corresponding drive wheel. Therefore, four rows can be harvested simultaneously with the traction wheels running between two pairs of the rows. Bracing extending from the frame to the outboard units which would otherwise obstruct the side of the harvester is eliminated.

A high volume discharge structure is supported between each pair of inboard-outboard harvesting units directly behind and for receiving picked cotton from the leading picker drums and doffer assemblies associated with two adjacent rows of cotton. The structure is located generally between two rear picking drums and doffer assemblies in an accommodation space provided between the units. A pair of conventional lower volume discharge structures are located behind the rear doffers and receive cotton picked by the drums. This arrangement provides a relatively narrow pair of complete picking unit assemblies which can be mounted just forwardly of the harvester drive wheels on the main frame so that the harvester is not front heavy. Two of the complete units are positioned side-by-side to provide a four-row cotton harvester. The high volume discharge structure reduces the number of discharge structure doors that have to be serviced during operation. The discharge structure is supported from the inner harvesting unit thus reducing the weight carried by the outer unit. The outer harvesting unit includes a hinged baffle plate extending rearwardly to the structure which permits the outer unit to be transversely adjusted with respect to the inner unit without having to adjust the structure. Therefore, adjustments of the outboard unit with respect to the inboard unit can be made easily to accommodate changes in the spacing between the rows, and the outboard unit can be completely removed without disturbing the discharge structure. Also, the discharge structure can be quickly removed from the rear of the harvesting unit so that the operator has easy access to the picking drums and doffer mechanisms. Only one cotton conveying duct is required for each pair of high volume picker drums, thereby reducing the number of ducts required on the harvester.

Other objects, features and advantages of the present invention will become apparent to those familar with the art as the present invention is described in relation to the accompanying drawings.

DESCRIPTION OF THE PREFERRED EMBODIMENT

Referring to the drawings, there is shown a cotton harvester 10 having a fore-and-aft extending frame or body shown partially at 12 supported near its forward end by a pair of transversely spaced drive wheels 14 and 16. The drive wheels are spaced an equal distance from the center line of the harvester 10 and in the preferred embodiment accommodate two rows of cotton therebetween as the harvester is propelled forwardly through the field. The rear of the frame 12 is supported on a pair of steerable wheels (not shown) in a conventional manner for guiding the harvester 10 over the field. An operator's station 18 is located on the frame and has numerous controls for operating the harvester. A conventional hydraulic system is carried by the frame 12 for various functions including raising and lowering the harvesting units.

Figure 1:
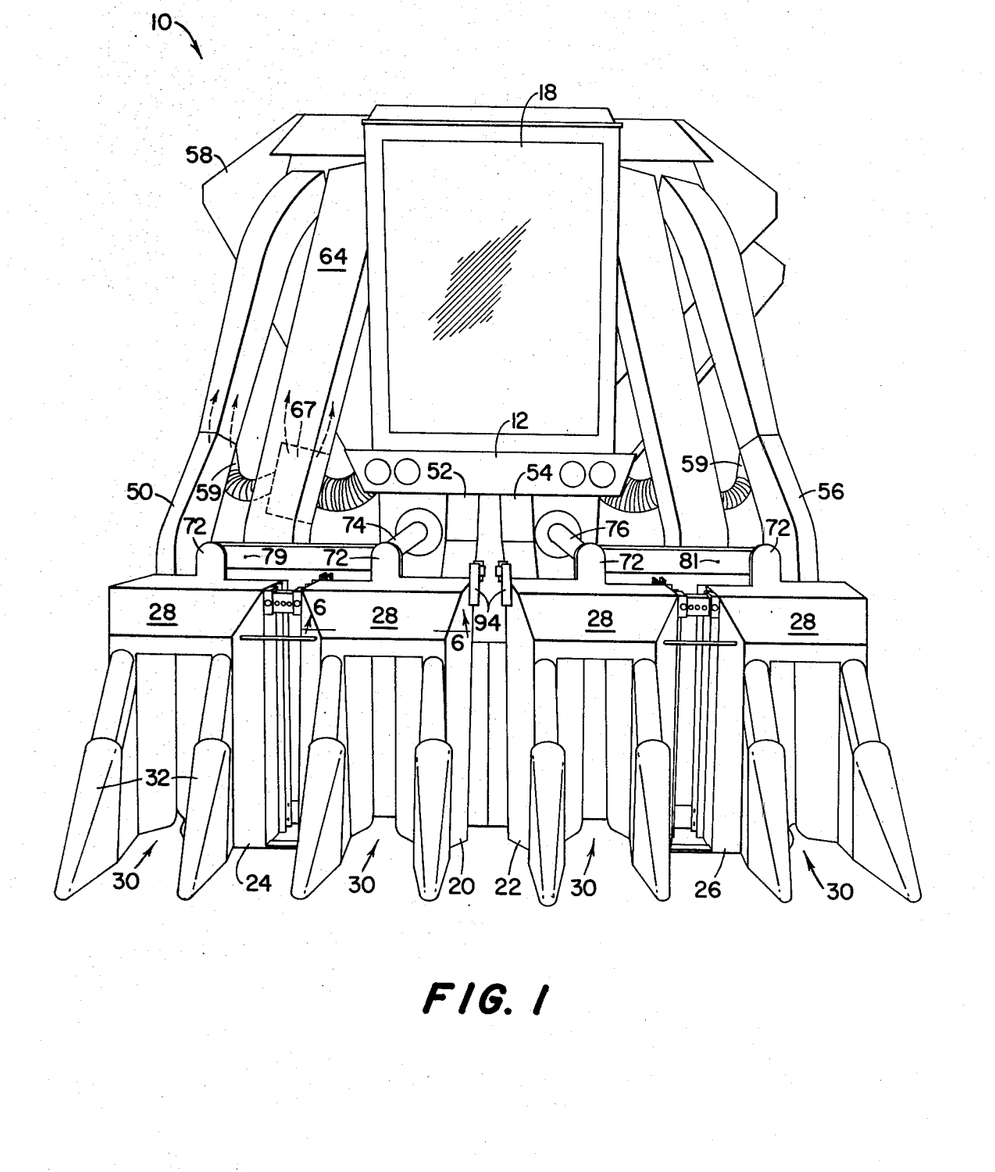
FIG. 1 is a front view of a four-row cotton harvester constructed in accordance with the present invention.

Positioned forwardly of the frame 12 are a plurality of individual picking or harvesting units 20, 22, 24, and 26. Each harvesting unit includes a housing assembly 28 defining a crop-receiving opening or passage 30 and carrying a pair of stalk lifters 32 on either side of the opening. In each housing assembly 28 are a forward and a rearward upright packing spindle drum 34 and 36, respectively, located on either side of the crop opening 30. Adjacent the spindle drums 34 and 36 are conventional upright doffing assemblies 38 and 40 which remove cotton from the spindles 41 of the drums. Conventional upright discharge structures 42, 44, 46, and 48 (FIG. 2) are provided near the rear doffers 40 to receive cotton bolls removed from the drums 36 by the doffers 40 and directed through upright openings 49 in the rear of the units. Cotton conveying ducts 50, 52, 54, and 56 (FIG. 1) direct the cotton from the discharge structures near the rear doffers into a basket 58.

The housing structures and ducts associated with the rear doffers 40 may, for example, be of the type shown in U.S. Pat. No. 3,515,437. An air nozzle 59 is provided near the lower portion of each of the ducts 50 and 56, while blower nozzles (not shown) are provided near the lower portion of the innermost discharge structures 44 and 46. A high volume suction door or discharge structure 60 receives the cotton from the forward spindle drums 34 and doffers 38 on the adjacent picking units 20 and 24 while a similar discharge structure 62 receives cotton from the corresponding picker drums and doffers on the units 22 and 26. The cotton is sucked from the discharge structures 60 and 62 through lower portions of the cotton conveying ducts 64 and 66 and then is blown into the basket 58 by air from nozzles 67 connected near the lower portion of the ducts 64 and 66. If a more complete description of the structure and operation of the air nozzles 59 and 67 is desired, reference may be had to co-pending application Ser. No. 100,318, filed concurrently herewith and entitled "Air Duct System for a Cotton Harvester".

The spindle drums 34 and 36 and the doffers 38 and 40 are driven by a conventional drive assembly located in a gear housing or cam support 70 in an upper box-like structure 71 of each housing assembly 28. A gear box 72 is located on the top of each housing assembly 28 and includes a bevel gear transmission which is operably connected by a vertical drive shaft to the drive assembly in the gear housing 70. Drive shafts 74 and 76 extend forwardly from the frame and operate the gear boxes 72 on the inner harvesting units 20 and 22. Telescoping transverse shaft members 78 and 80 (FIG. 2) operably connect the gear boxes on the outboard units 24 and 26, respectively, with gear boxes on the adjacent inboard harvesting units. Shields 79 and 81 (FIG. 1) cover the shafts 78 and 80, respectively.

Figure 2:
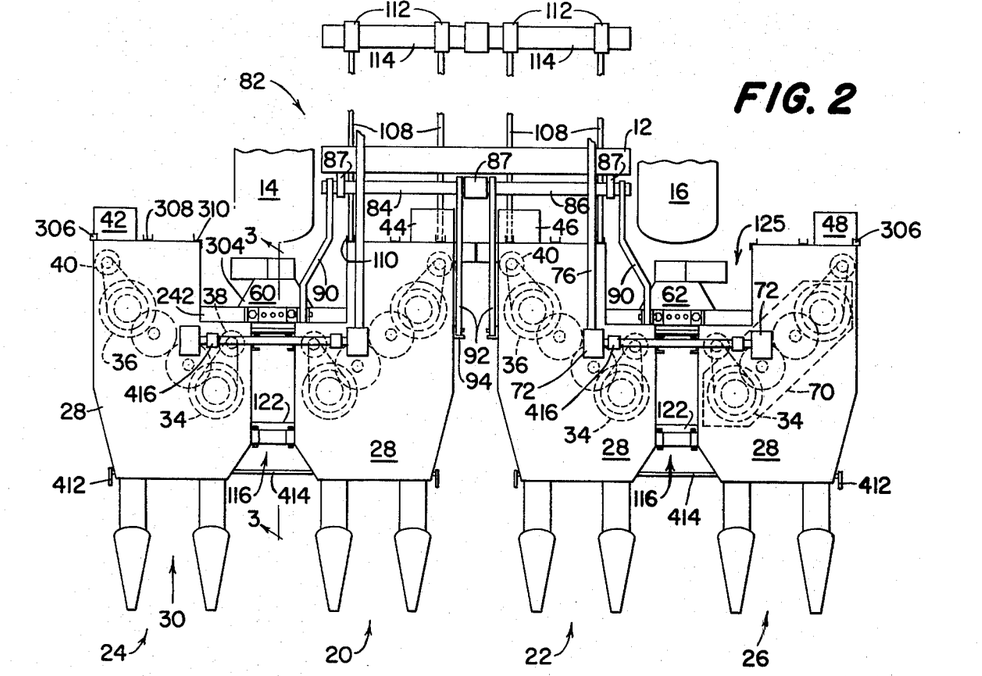
FIG. 2 is a plan view of the front of the harvester shown in FIG. 1 with parts thereof removed for purposes of showing internal mechanisms.
Figure 5:
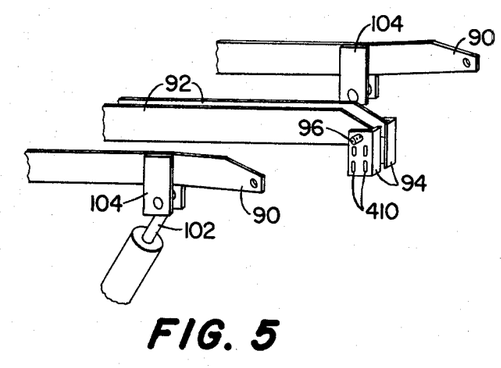
FIG. 5 is a perspective view of the two pairs of lift arms in the unloaded condition wherein each outer lift arm is angled upwardly with respect to the adjacent inner lift arm.

As seen best in FIG. 2, a support assembly indicated generally at 82 is provided for mounting the harvesting units 20-26 on the forward end of the frame 12 and for moving the units vertically with respect to the frame. The assembly 82 includes a pair of axially aligned, transverse rockshafts 84 and 86 supported from the frame 12 by brackets 87. Welded to and extending forwardly from each rockshaft are a reinforced outer lift arm 90 (FIG. 5) and an inner lift arm 92. The inner lift arms 92 are connected to the corresponding units 20 and 22 by adjustable brackets 94 bolted to the inwardly facing sides of the upper box-like structures 71. A transverse pivot pin 96 extends through bushings in the bracket 94 and the lift arm 92. The outer lift arms 90 are connected to the housing assemblies 28 of the inner units by upright brackets 98 and transverse pins 100 extending through the corresponding brackets and arms. A hydraulic cylinder 102 is connected between reinforcing members 104 on each outer lift arm 90 and the frame 12. As best seen in FIG. 5, the outer lift arms 90 are secured to the rockshafts 84 and 86 so that they are angled or preloaded upwardly with respect to the inner lift arms when the harvesting units are disconnected. In other words, with the lift arms unloaded, the outer lift arms 90 are positioned higher than the inner lift arms 92. As will be discussed in detail later, the upward preloading prevents the outboard harvesting units from dropping lower than the inboard units from which they are supported. The slots in the brackets allow the inwardly facing sides of the inner units to be adjusted vertically so that the units can be levelled in the transverse direction.

Stabilizer bars 108 extend between lower rear brackets 110 on the inboard units 20 and 22 and arms 112 carried by a pair of rockshafts 114 supported on the frame 12. The stabilizer bars 108 provide lower support for and determine the front to rear slope of the harvesting units 20 and 22. As best seen in FIG. 2, stabilizer bars are connected only between the inboard units 20 and 22 and the frame. Two bars are provided for each inboard unit, one connected to the bottom frame of the compartment inboard of the plant passage 30 and the other connected to the bottom frame outboard of the passage.

In the preferred embodiment, the outboard harvesting units 24 and 26 are supported entirely from the inboard units 20 and 22, respectively. Each outboard unit is cantilevered from the inboard unit by an adjustable tie assembly indicated generally at 116. A front telescoping cross member 118 (FIG. 3) connects the upper forward portion of the outboard unit with the forward end of the corresponding inboard unit. A rear telescoping cross member 120 connects the rear portions of the adjacent units. Front and rear lower tie plates 122 and 124 are bolted to and maintain a preselected spacing between the lower portions of the adjacent inboard and outboard units. The cross members and tie plates connected to the inboard units not only space the adjacent units but also provide fore-and-aft support for the inboard compartment associated with the forward spindle drums 34 on the outboard units 24 and 26. The adjustable tie assemblies 116 are identical for the left- and right-hand pairs of harvesting units.

The outer harvesting units 24 and 26 are essentially the mirror images of the inner units 20 and 22 from which they depend, as best seen in FIG. 2. An accomodation space 125 (FIG. 2) is provided between the adjacent pairs of units just ahead of each of the wheels 14 and 16 wherein are located the discharge structures 60 and 62.

Figure 6:
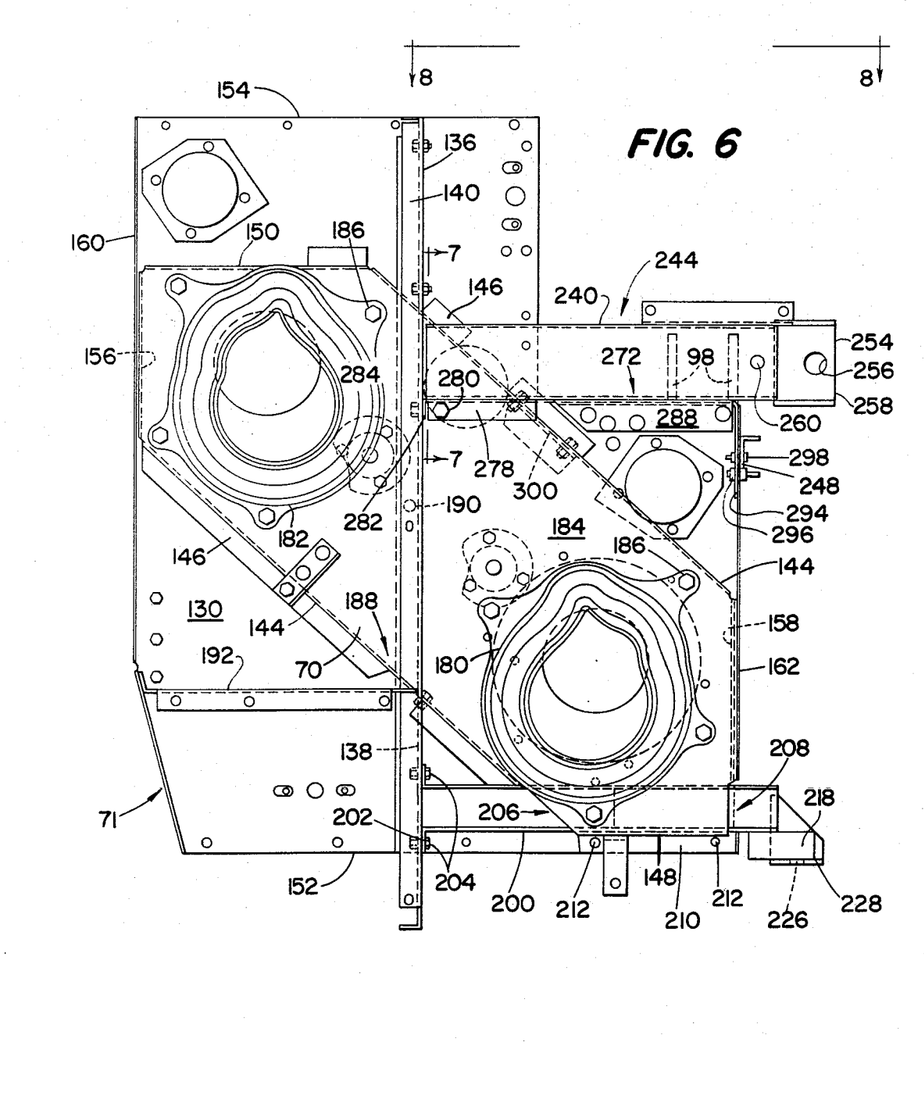
FIG. 6 is a bottom view of the upper box-like structure of the right-hand inboard picking unit as seen substantially along the line 6—6 in FIG. 1.

The upper box-like structure 71 (FIGS. 3, 4 and 6) of each housing assembly 28 includes a top plate 130 and a center sheet 132 spaced below and substantially congruent with the top plate 130. The space between the top plate 130 and the center sheet 132 form a compartment 134 (FIG. 3) extending substantially the entire width of the row unit. A sheet metal stiffener 136 extends in the fore-and-aft direction through the compartment 134 and includes top and bottom flanges 138 and 140, bolted to the top plate 130 and center sheet 132, respectively. The sheet metal stiffener 136 is notched at the top as shown generally at 142 in FIG. 3 to accommodate the pan-shaped gear housing or cam support 70 which extends diagonally across the top of the unit. The cam support 70, as best seen in FIG. 6, which is a view looking upwardly into the box-like structure above the center sheet 132 with the arrow indicating the forward direction of travel, includes side walls 144 with upper flanges 146 welded or otherwise secured to the top plate 130. The ends of the cam support 70 are generally closed by front and rear end walls 148 and 150 essentially parallel to front and rear top plate edges 152 and 154, respectively, and by side end walls 156 and 158 which extend upwardly just inside downturned flanges 160 and 162 on the respective outer and inner edges of the top plate 130. Conventional side panels, which are removed in FIG. 6 for purposes of clarity but are shown at 164–168 in FIG. 4, are connected by bolts 170 and 172 between the downturned flanges 160 and 162 of the top plate 130 and corresponding upturned flanges 174 directly below on the center sheet 132. The side end walls 156 and 158 of the cam support 70 are connected to corresponding side panels by bolts 176. The adjustable bracket 94 is connected to the inner units by four bolts which extend through the vertical slots in the bracket and through the panel into the side end wall 156 on the inboard unit.

Front and rear cam castings 180 and 182 connected to the bottom 184 of the cam support 70 by bolts 186 at a plurality of angularly spaced points afford a reinforcing characteristic to the support 70. The notch 142 in the stiffener 136 which accommodates the cam support 70 is flanged at 188 and the bottom 184 of the support is connected to the flange by bolts 190. A flanged transverse structural sheet 192 is bolted between the top plate 130 and the center sheet 132 and is also bolted to the stiffener 136.

A more detailed description of a typical housing structure made of sheets and panels may be found in the aforementioned U.S. Pat. No. 2,803,938. The present structure is shown in sufficient detail to adequately describe the attachment of the telescoping cross members 118 and 120 for cantilevering an outboard harvesting unit from the adjacent inboard unit. The right-hand inner harvesting unit 20 is substantially the mirror image of the left-hand inner unit 22, so only the attachment of the members to the inboard unit 20 and corresponding outboard unit 24 will be described in detail. The symmetry of the inboard-outboard unit pairs and the inboard and outboard units results in increased standardization of components.

Figure 3:
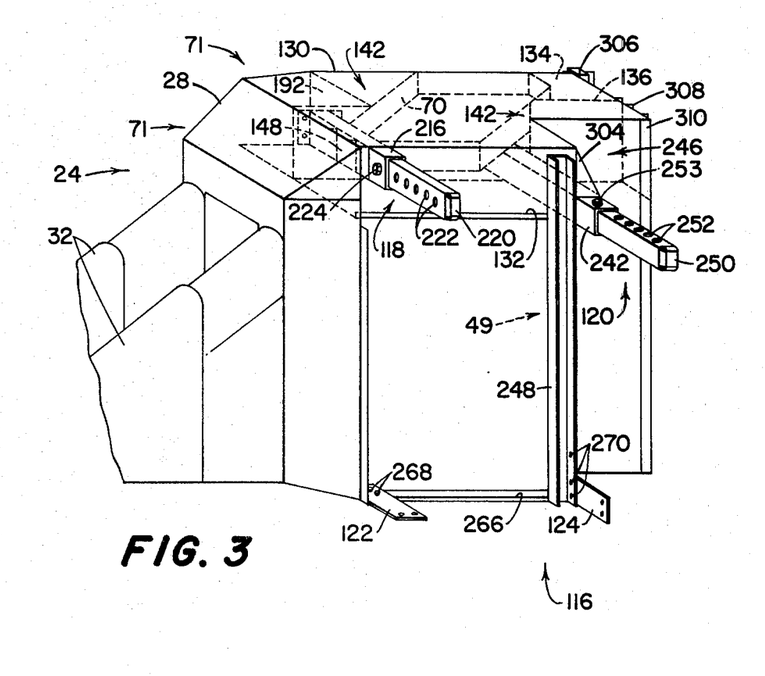
FIG. 3 is a perspective view of an individual right-hand outboard picking unit for the harvester of FIG. 1 with the drive assembly removed and showing schematically the location of the cross members in relation to the upper rigid structure.
Figure 4:
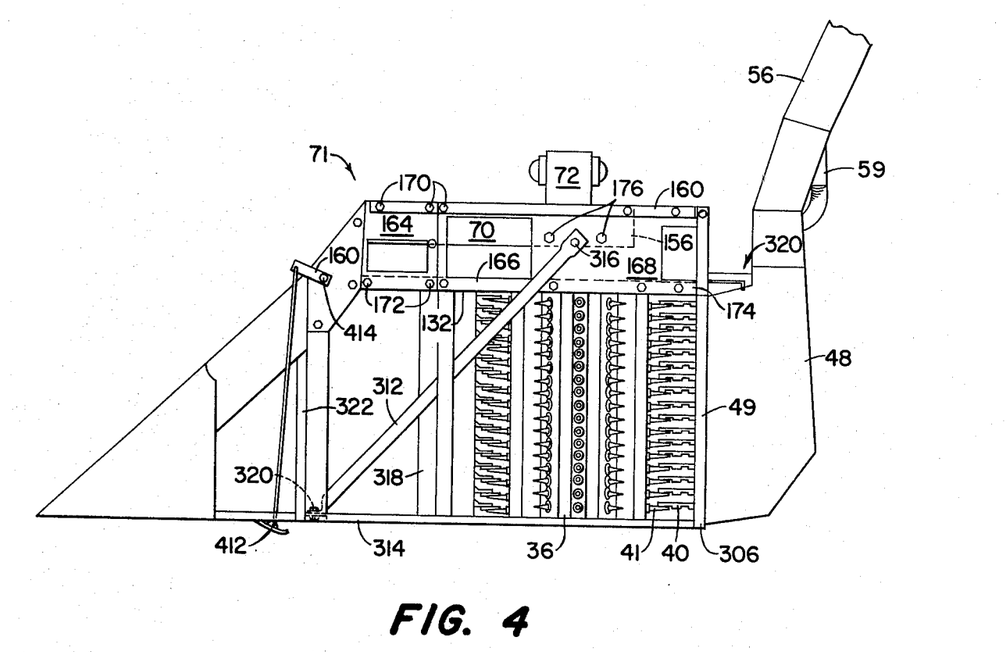
FIG. 4 is a side view of an individual left-hand outboard picking unit showing the diagonal brace.

Referring to FIG. 3 wherein the general location of the adjustable tie assembly 116 with respect to the housing assembly 28 for the unit 24 is shown diagrammatically, and to FIG. 6, the front telescoping cross member 118 includes a first tubular beam 200 having a flanged end 202 connected to the sheet metal stiffener by bolts 204. The beam 200 extends transversely from the stiffener and through notches at 206 and 208 in the cam support side wall 144 and side end wall 158, respectively. The bottom 184 of the cam support 70 extends under the tubular beam 200 to a juncture with the front end wall 148 of the support which extends upwardly adjacent the forward side of the beam and terminates in a flange 210 which is bolted at locations 212 to the top plate 130. The support may also be spot-welded to the plate 130. The beam 200 is rigidly connected to the cam support 70 by welding the beam to the wall 148 and support bottom 184. The beam 200 extends outwardly beyond the flange 162 and the corresponding side panels.

The adjacent outboard unit 24 (FIG. 3) supports a second tubular beam 216, essentially identical to the beam 200, in substantially the same manner as the beam 200 is supported in the unit 20. The upper box-like structure 71 for the unit 24 is the mirror image of the structure 71 for the adjacent unit 20 and for brevity, many of the corresponding parts are numbered identically in both FIGS. 3 and 6. Many of the components in the housing assemblies are identical because of the symmetry of the units. The first tubular beam 200, however, carries a jack bracket 218 (FIG. 6) for providing a leverage point to be used when the adjacent units are adjusted transversely with respect to each other. A forward bar 220 with transversely spaced apertures 222 is secured within the tubular beam 216 of the unit 24 by a bolt 224 extending through holes in the upright walls of the beam and through one of the apertures 222. When the outboard unit is attached to the inboard unit, the bar 220 is received by the first tubular beam 200. The outboard unit can then be adjusted with respect to the inboard unit by extending a lever or similar tool through a hole 226 in a forward wall 228 of the jack bracket 218 and into one of the apertures 222 and moving the tool to slide the bar 220 into or out of the beam 200. A bolt is inserted through holes 230 in the beam 200 and through another of the apertures 222 to maintain the deserved spacing after the units are adjusted.

The rear telescoping cross member 120 is also rigidly tied into the upper box-like structure 71 of the adjacent inboard and outboard units. The cross member 120 includes a square tubular beam 240 rigidly attached to the inner unit and a tubular beam 242 attached in substantially the same fashion to the outboard unit. The tubular beams 240 and 242 are actually attached to rear panel assemblies 244 and 246, respectively, which are tied to the top plate 130, center sheet 132, cam support 70, and stiffener 136, as well as to a vertical channel post 248 on each unit as described in detail below. A square bar 250 with apertures 252 is positioned within the square tubular beam 242 of the outboard unit and secured therein by a bolt 253. The bar 250 is inserted into the beam 240 as the outboard unit is attached to the corresponding inboard unit. A jack bracket 254, similar to the jack bracket 218 but having a hole 256 in an upper plate 258 for easier access, is welded to the beam 240. Holes 260 receive a bolt which also passes through one of the apertures 252 to maintain the selected spacing between the inboard and outboard units. The adjustable tie assembly 116 includes the front horizontally disposed tie plate 122 extending between and bolted to adjacent bottom frames 264 and 266 which run from the front to the back of each unit and form the floor structure below the forward spindle drums 34 and doffing assemblies 38. The tie plate 122 is bolted through one of two sets of transversely spaced holes 268 depending on whether relatively widely or narrowly spaced rows of cotton are being harvested. The rear tie plate 124 is bolted between the rear flanges of the channel posts 248, either in a horizontal position as shown in FIG. 3 for widely spaced rows or alternatively in a vertical position rotated 90° from that shown in FIG. 3 for narrower rows. Holes 270 in the channel posts 248 accommodate the bolting of the plate 124 in either position.

Figure 7:
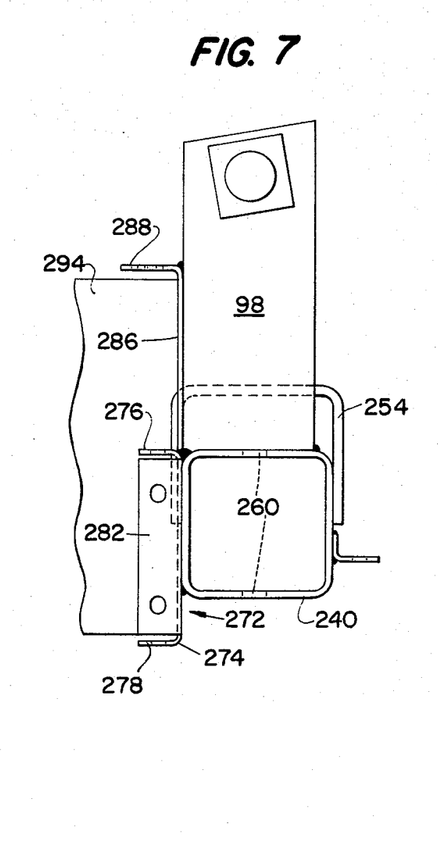
FIG. 7 is an enlarged end view of the support panel assembly as seen substantially along the line 7—7 in FIG. 6.
Figure 8:
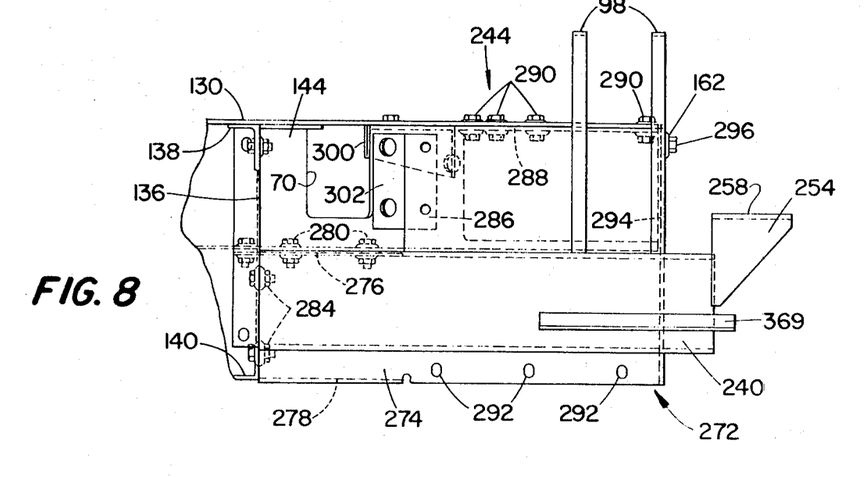
FIG. 8 is an enlarged rear view of the support panel assembly as seen substantially along line 8—8 in FIG. 6.

The rear panel assemblies 244 and 246 which carry the tubular beams 242 and 244, respectively, will now be described. Welded to the front face of the beam 240 is a panel 272 (FIGS. 6-8) having an inner end portion 274 with an upper flange 276 aligned with and extending forwardly from the top of the beam 240. The end portion 274 extends below the beam 240 terminating in a forwardly extending flange 278 directly below the flange 276. The distance between the flanges 276 and 278 is equal to the distance between the bottom 184 of the cam support 70 and the center sheet 132. The flange 278 is connected to the center sheet 132, and the flange 276 is connected to the bottom 184 of the cam support 70 by bolts 280. An end flange 282 on the panel 272 is connected to the stiffener 136 by bolts 284.

An outer end section 286 of the panel 272 is a continuation of the portion 274 but extends upwardly therefrom to the top plate 130 terminating in a top flange 288 connected to the plate 130 by four bolts 290. The lower part of the panel section 286 is bolted to a flange (not shown) on the center sheet 132 at locations 292. The lift brackets 98 are welded to the section 286 of the panel 272 and to the beam 240. A leg 294 extends forwardly from and at a right angle to the section 286 and is connected to the top plate flange 162 by a bolt 296. The leg 294 is also connected to the vertical channel post 248 by a bolt 298 and to the center sheet 132. The channel post 248 is connected at its lower end to the bottom frame 264. To provide additional strength in the area where the beam 240 is connected to the cam support 70, an upper bracket 300 is connected to the top plate 130 and the cam support side wall 144. A rear bracket 302 is bolted to the side wall 144 and bracket 300 and is connected to the section 286 of the panel 272.

The rear panel assembly 246 (FIG. 3) for the outboard unit is essentially identical to the above-described assembly 244. Since no lift arms are connected to the outboard unit, a single brace 304 is welded between the beam 242 and the panel rather than lift arm brackets.

Additional strength is provided by double-channel posts shown at 306 connected at the outer rear corners of the outboard units extending between the upper box-like structure 71 and the corresponding bottom frame. Reinforcing channel posts 308 and corner angles 310 also extend between and space the structure 71 and the bottom frame. The various posts and angles are structurally tied to the bottom frames, center sheet and top plate of each unit by conventional means such as by bolting to flanges provided on the various components.

The outboard units are supported entirely from the inboard units. To provide fore-and-aft support for the outboard units without utilizing lower stabilizers, a diagonal brace 312 (FIG. 4) is connected between the rigid upper box-like structure 71 and the front of the outer bottom frame 314. The upper end of the brace 312 is connected to the panel 168 and the cam support 70 by a bolt 316. The brace 312 extends downwardly through a hole in a corner support 318 and terminates in a flattened end which is connected to the frame 314 by a bolt 320 inwardly of a front support 322. The corner and front supports 318 and 322 are connected between the structure 71 and the frame 314. The respective bottom frames are supported from the structure 71 by the supports and channel posts.

If an outboard unit is grounded or strikes an obstacle while the harvester 10 is moving forwardly through the field, the fore-and-aft force acting on the outer bottom frame 314 (FIG. 4) of the housing assembly frame that would otherwise distort and collapse the unit is transferred to the rigid structure 71. Therefore, to collapse the unit the structure 71 would have to bend. However, the above-described rigid box construction of the structure 71 provides a very strong beam which will not yield to the force transferred through the diagonal brace 312. Fore-and-aft support for the harvesting unit structure located inwardly of the crop receiving opening 30 on the outboard units 24 and 26 is provided by the telescoping cross members 118 and 120 which are rigidly tied to the box-like structure 71 on the units and on the corresponding inboard units 20 and 26, and by the lower tie plates 122 and 124.

The upright opening 49 in the housing assemblies 28 are provided in a conventional manner behind the doffers 38 and 40, such as by leaving uncovered an area generally extending vertically between the upper box-like structure 71 and the bottom frame and horizontally between the upright structural supports. The discharge structures 42-48 (FIGS. 2 and 4) are of a conventional design well known to those skilled in the art and are attached by suitable brackets or the like to the rear of the harvesting units 20-26 and open forwardly into the upright opening 49. The discharge structure 48 (FIG. 4) is connected to the unit 26 by a flanged connection at the bottom frame and is clamped to the center sheet at 320.

Figure 12:
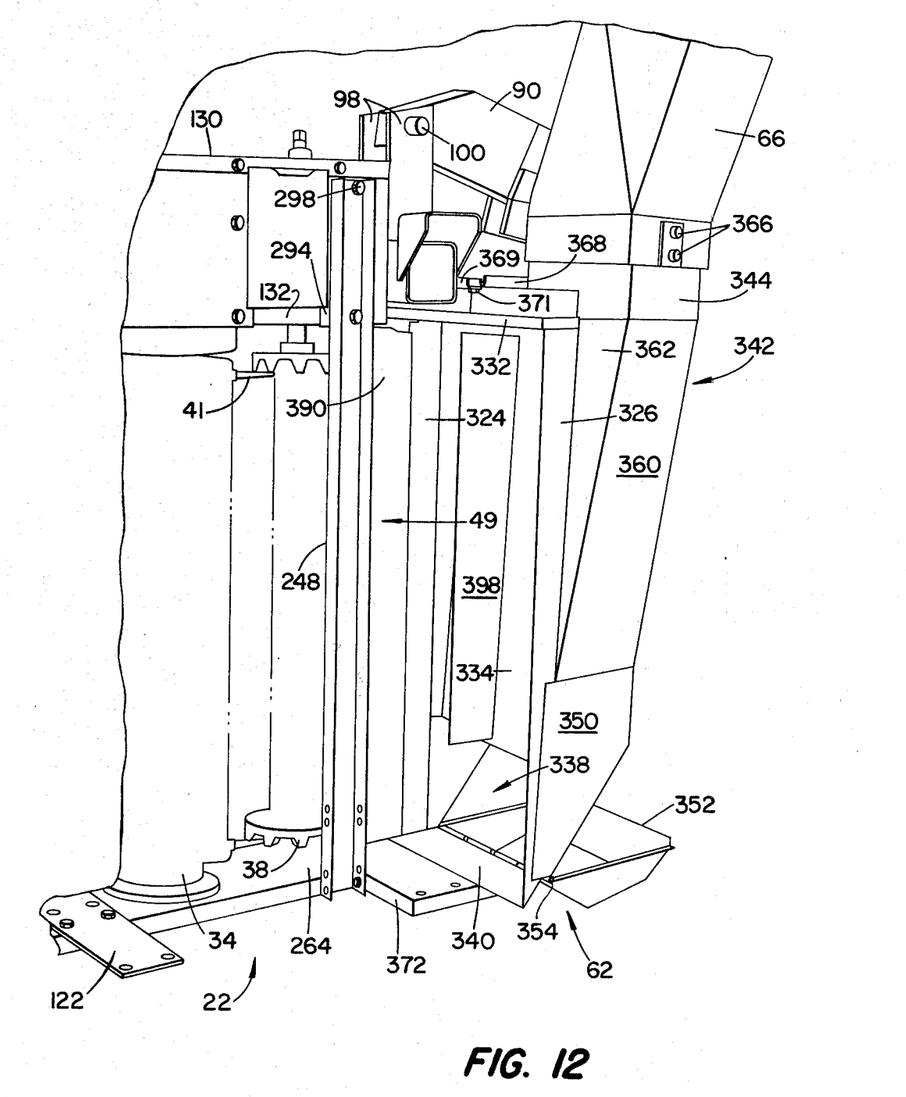
FIG. 12 is a perspective view of the left-hand inboard picking unit, with the left-hand outboard unit removed and the high volume discharge structure attached.

Referring now primarily to FIGS. 2, and 9-14 there are shown the high volume suction door assemblies or discharge structures 60 and 62 which receive the cotton from the forward doffers 38. Since the suction doors 60 and 62 are substantially identical, only the right-hand structure 60 will be described in detail. Corresponding parts on the left-hand structure 62, shown attached to the inboard harvesting unit 22 in FIG. 12, are numbered identically for brevity.

The assembly 60 includes a pair of upright, forwardly diverging side walls 324 and 326, preferably formed from sheet metal and including forwardly bent lips or U-shaped portions 328 and 330. The side walls 324 and 326 define a forward opening in the assembly 60. A metal strap 332 spaces and provides upper support for the side walls 324 and 326. The strap 332 extends around the side walls thereby reinforcing the top portion of the assembly 60 which opens upwardly. A rear wall or partition 334 connects the side walls 324 and 326. The partition 334 extends downwardly from the strap 332 and terminates above the bottom of the assembly 60 to define a cotton receiving opening 338. The lower portion of the assembly 60 between the side walls 324 and 326 is closed by a bottom panel 340 which is angled slightly upwardly from the horizontal.

A rearwardly and outwardly extending duct 342 is fixed to the rear of the rear partition 334 and defines a passageway connecting the opening 338 with a duct-connecting portion 344. The connecting portion 344 receive the lower portion of the cotton conveying duct 64 or 66 which extends rearwardly to the cotton receptacle 58 on the harvester. The duct 342 includes opposite lower side walls 350 extending rearwardly from the side walls 324 and 326. A clean-out door 352 is connected by a hinge 354 to the rear of the bottom panel 340 and forms a closure behind the opening 338. A latch 356 releasably secures the clean out door 352 so the door can be lowered to clean out any trash build-up near the lower portion of the assembly 60. The duct 342 extends upwardly from the side walls 350 and is generally rectangular in cross-section having a rear wall 358 and opposite side walls 360. A forward duct wall 362 is connected between the side walls 360 generally parallel to the partition 334. As is evident from FIG. 10, the duct 342 angles outwardly toward the right (toward the left in FIG. 12) so that the left most side wall 360 is located near the center of the partition 334 at the top of the assembly 60. The connecting portion 344, which is generally rectangularly shaped, extends substantially straight upwardly from the top of the duct 342. A pair of transversely extending pins 366 receive a pair of mating connectors attached to the conveying duct 64 or 66 to hold the duct in position on the connecting portion 344. A bracket 368 is connected to the upper portion of the assembly 66 and is connected by bolts 371 to a bracket 369 welded to the tubular beam 240 of the right-hand inner harvesting unit 20. A lower bracket 370 is welded to the bottom panel 340 and is connected to a plate 372 by bolts 373. As best seen in FIG. 12, the plate 372 is bolted to the vertical channel post 248, and, together with an extension plate 374 (FIG. 9) bolted thereto and the rear tie plate 124, close the lower area between the bottom panel 340 and the post 248. Support for the double-door assembly 60 is therefore provided by the inner harvesting unit for reducing the weight carried by the outer unit, and for ease in assemblying the units and in adjusting the units transversely with respect to each other. The outer unit can be detached, as shown in FIG. 12, without removing the double-door assembly. The slope of the duct 342 permits the connecting portion 344 and the corresponding conveying duct 64 or 66 to be outwardly offset so that the two outermost ducts 50 and 62, or 56 and 66, are spaced more closely, and better cab clearance and operator visibility are provided. More room is also provided for the outer lift arm 90 by offsetting the duct.

Figures 9, 13, 14:
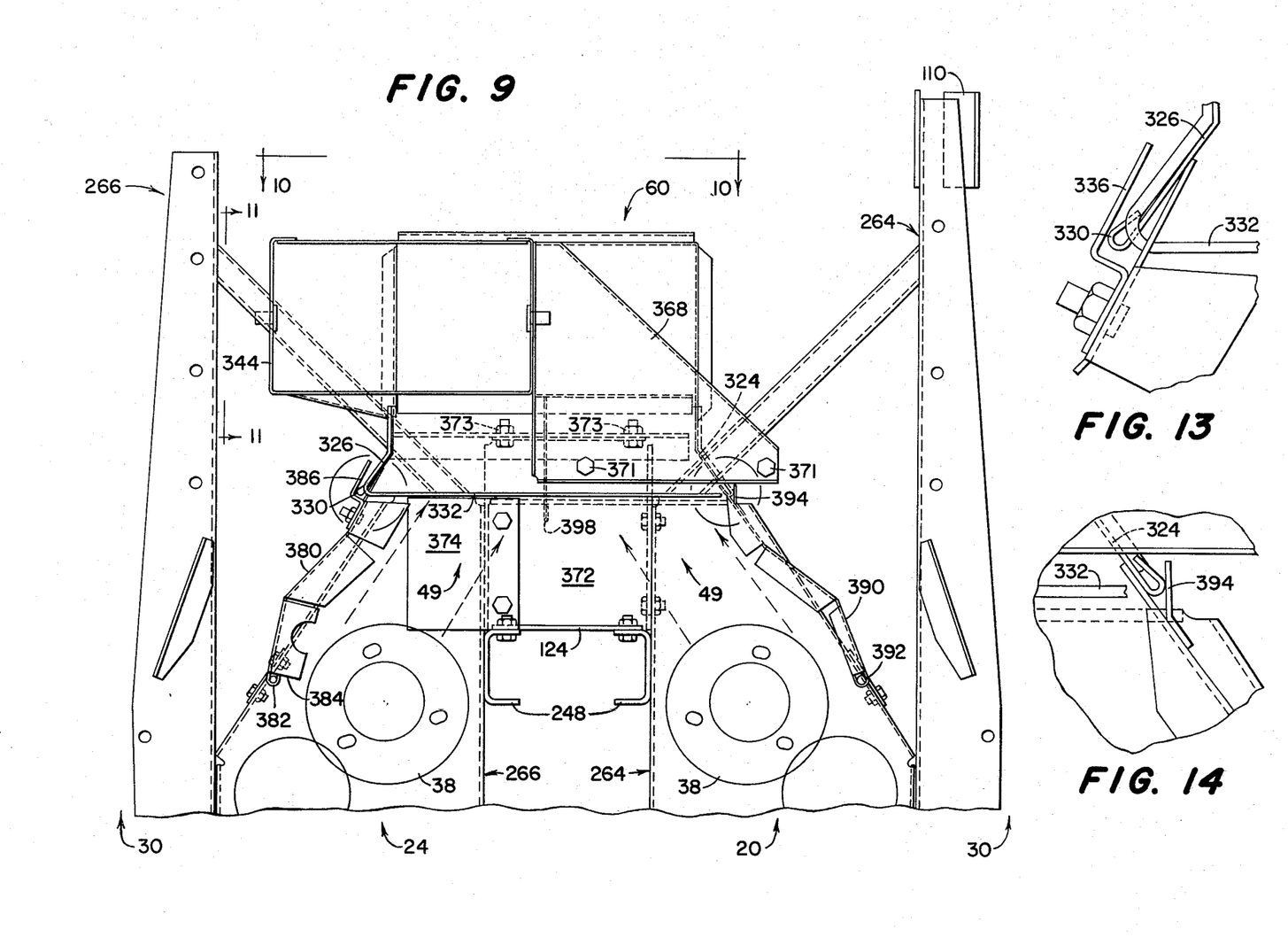
FIG. 9 is an enlarged partial overhead view of adjacent rear portions of the right-hand inboard and outboard units with the discharge structure attached and the upper portion of the units removed to show the hinged baffle plate.
FIG. 13 is a top view, on an enlarged scale, of the vertical channel portion of the outer hinged baffle and the corresponding side wall of the discharge structure shown in FIG. 9.
FIG. 14 is a view similar to that of FIG. 13, but showing the vertical channel portion of the inner baffle with a portion of the upper strap broken away for clarity.
Figure 10:
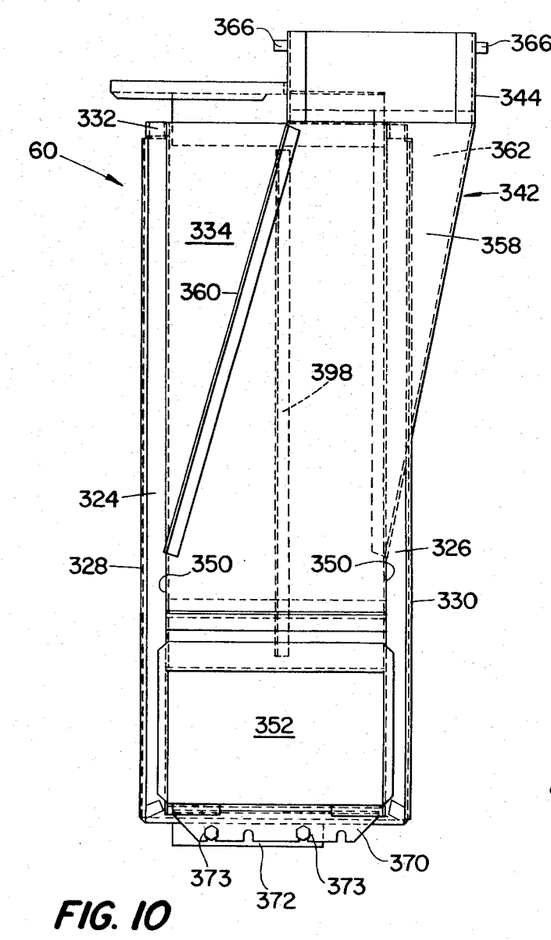
FIG. 10 is a rear view of the discharge structure as seen along the line 10—10 in FIG. 9.
Figure 11:
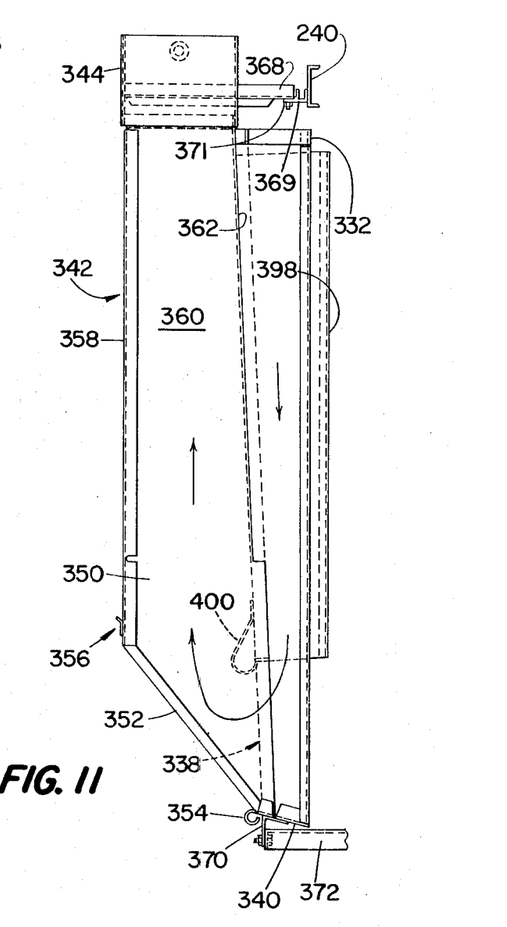
FIG. 11 is a side view of the discharge structure as seen along the line 11—11 in FIG. 9.

As best seen in FIG. 9, a vertical baffle plate 380 extends from a point beside the right-hand doffer 38 to the rear of the unit 24. The baffle plate 380 is pivotally connected at its forward edge 384 to a substantially vertical hinge 382 and extends rearwardly to a rear vertical channel portion 386 (FIG. 13) which extends on either side of the lip 330 of the discharge structure side wall 326. A second baffle plate 390 is hinged at 392 to the inboard unit 20 and extends rearwardly, terminating in a vertical channel 394 (FIG. 14) which extends on either side of the lip 328 of the side wall 324 of the door assembly 60. The baffle plates 380 and 390 define one boundary of each upright opening 49 which opens onto the front portion of the structure 60. Cotton removed by the doffers 38 is conveyed rearwardly through the openings 49 as indicated by the arrows in FIG. 9. The cotton strikes the rear partition 334, dropping downwardly to the opening 338 where it is sucked upwardly through the duct 342 and 344 and rearwardly through the duct 64 or 66 into the harvester basket. An upright fore-and-aft extending divider panel 398 is provided between the side walls 324 and 326 to prevent cotton from one of the doffers 38 from being thrown into the opposite doffer area. A deflector 400 (FIG. 11) is connected to the structure 60 just above the opening 338 to improve the flow of cotton and air from the forward portion of the housing assembly 60 to the duct 342. The forward portion of the structure between the harvesting units 20 and 24 and above the closure formed by the plates 124, 372 and 374, is opened to the atmosphere to provide the air for the suction door.

As the outer unit 24 is adjusted transversely with respect to the inner unit 20, the discharge structure 60 which is fixed to the inner unit changes position with respect to the outer unit. The panel 380 can pivot about the hinge 382 to accommodate the change in position, thereby eliminating need to change or otherwise readjust the panel.

The double-door assemblies 60 and 62 handle the entire volume of cotton picked by the forward spindle drums 34. Each double-door assembly allows a single air duct to service a pair of spindle drums. By attaching the double-door assembly to the inboard unit and hinging the baffle plate 380 to the outboard unit, assembly and adjustment of the row units with respect to each other is simplified. The entire structure 60 can be easily removed during servicing of the units by removing the bolts 371 and 373. Various conventional types of connectors well known to those skilled in the art can be used to attach the structures 60 and 62 to the unit.

The brackets 94 connecting the lift arms 90 and 92 with the inboard units 20 and 22 include adjustable lift arm pins which allow each harvesting unit to be adjusted laterally with respect to the corresponding arms so that the spacing between the two inboard units can be varied to accommodate the particular row spacing in the field to be harvested. In addition, the brackets 94 which are bolted to the harvesting units include vertical slots 410 for transversely leveling the units. The lower stabilizer bars 108 (FIG. 2) include an adjusting turnbuckle (not shown) for adjusting the front to rear slope of the harvesting units. The bars 220 and 250 of the tie assembly 116 are telescoped within their corresponding beams and the tie plates 122 and 124 are connected so that the desired spacing between the inboard and outboard units may be achieved.

Each rockshaft 84 and 86 can be controlled independently by the hydraulic cylinder 102 so that the height of the pair of harvesting units 20 and 24 can be controlled independently of the height of the harvesting units 22 and 26. Automatic height sensing assemblies 412 which may be of the type shown in U.S. Pat. No. 3,643,407, are provided near the inside of each inboard unit and on the outward side of the outboard unit and are connected through a hydromechanical valve to the control system for the hydraulic cylinders 102 to automatically raise and lower each inboard-outboard harvesting unit pair and maintain it a predetermined distance above the ground during harvesting of the crop. The individual units for each pair are tied together by a rod 414 so that the individual harvesting unit that is closest to the ground at any given time will control the operation of the automatic height adjustment mechanism.

The drive shaft assembly connecting the outboard gear box assembly with the inboard gear box assembly for each inboard-outboard pair of harvesting units telescopes at splined connections 416 (FIG. 2) to facilitate transverse adjustment of the units with respect to each other. The drive shafts 74 and 76 receive power through a conventional belt and pulley arrangement connected to the main drive shaft of the harvester 10. Air is supplied to the conveying ducts 50, 52, 54, 56, 64, and 66 by a blower which may be of the type described in detail in U.S. Pat. No. 3,487,450. A pair of flexible air supply conduits 420 receive air from the blower and direct it to the nozzles 67. The nozzles 67 are also connected by conduits 422 to the adjacent nozzles 59 on the outermost ducts 50 and 56 to supply air thereto.

In preparation for harvesting, the inner harvesting units 20 and 22 are transversely adjusted on the pivots 94 to properly space the plant passages 30 for the particular row spacings. The tie asemblies 116 are adjusted to space the outer units 24 and 26 with respect to the adjacent inner units.

The drive wheels 14 and 16 embrace two rows of cotton plants which are harvested by the inner units 20 and 22. The outer units 24 and 26 harvest the rows immediately outward of the drive wheels.

The tie assemblies 116 maintain the outer units at approximately the same level as the corresponding inner units. The height of the pairs of units 20-24 and 22-26 are individually adjustable by the two cylinders 102 which during harvesting are controlled automatically by the height sensing units 412. The upwardly preloaded lift arms 90 prevent the outer units from dropping below the level of the adjacent inner unit as the inner lift arms 92 are torqued upwardly with respect to the arms 90. The stabilizers 108 maintain the desired front-to-rear slope of the inner units 20 and 22. The tie assemblies 116 keep the slope of the outer units substantially the same as the adjacent inner units. Upright channel-shaped rub plates 424 and 426 (FIGS. 1 and 2) are bolted to the inner side panels of the inboard units 20 and 22, respectively, to maintain the proper spacing between the units while allowing the units to move up and down freely with respect to each other. The outward force exerted on the lower portion of the units 20 and 22 as the rub plates are forced into contact with each other tends to pivot the inboard-outboard pairs of units about the lift arms and thereby provide a lifting effect which helps to maintain the outboard unit level with respect to the inboard unit.

While only one form of the invention has been shown, it should be recognized that other forms and variations will occur to those skilled in the art. Therefore, while the present disclosure was shown and described in detail for purposes of fully and concisely illustrating the principles of the invention, it should be understood that such was the purpose of this disclosure and was not intended to limit or narrow the invention beyond the broad concepts set forth in the appended claims.

We claim:

1. A cotton harvester for use in a field with parallel rows of cotton plants, comprising: a main frame, a pair of frame-carrying wheels spaced for embracing two adjacent rows, a pair of inner harvesting units carried forwardly on the frame between the wheels, each unit having a plant-receiving opening for receiving one of the adjacent rows and means for removing the cotton from the row, an outboard harvesting unit, and means for supporting the outboard harvesting unit outwardly of one of the inner units in cantilever fashion, said outboard unit including means for removing the cotton from a row outside the two adjacent rows.

2. The harvester as set forth in claim 1 wherein the means for supporting the outboard unit comprises an adjustable interconnecting member between the outboard unit and the adjacent inner unit for transversely adjusting the adjacent units with respect to each other to accommodate different row spacings.

3. The harvester as set forth in claim 1 wherein the outboard unit comprises a frame member having a forward section defining a plant-receiving opening, an outermost side portion, and a top portion, the unit further comprising a brace member extending diagonally along the side portion and connected at its lower end near the forward section and at its upper end near the top portion.

4. A harvester for use in a field with parallel rows of crops comprising: a main frame, a pair of transversely spaced wheels mounted on and supporting the main frame for accommodating two adjacent rows therebetween, a pair of inner picking units mounted forwardly of and generally between the wheels, each unit having a crop receiving opening for receiving one of said adjacent rows, an outer picking unit transversely cantilevered from one of the inner units and including a crop receiving opening for receiving a row outward of the nearest wheel, and means for transversely adjusting the outer unit with respect to the inner unit to accommodate different row spacings.

5. The harvester as set forth in claim 4 wherein the outer picking unit and the inner picking unit from which the outer unit is cantilevered each include a housing assembly having an upper box-like structure and a lower frame structure, and wherein the means for transversely adjusting the outer unit with respect to the inner unit comprises a telescoping cross member connected to the respective box-like structures.

6. The harvester as set forth in claim 5 further comprising a lower tie plate connected between the lower frame structures.

7. The harvester as set forth in claims 5 or 6 wherein the lower frame structure includes a forward portion and wherein the outer unit includes a diagonal brace extending between the upper box-like structure and the forward portion of the outer unit to absorb fore-and-aft loading on the outer unit.

8. The harvester as set forth in claims 5 or 6 wherein the upper box-like structures include a substantially horizontal top plate, a gear housing attached to the top plate, a center sheet located below and generally parallel to the top plate, and a stiffener extending in the fore-and-aft direction between the center sheet and top plate, and wherein the cross members are connected to the gear housing and the stiffener.

9. A cotton harvester for use in a field with parallel rows of cotton plants, comprising:
a main frame;
a pair of frame carrying wheels spaced between two outboard rows and embracing two adjacent inboard rows;
first and second inboard harvesting units carried forwardly on the frame between the wheels, each unit including an upper box-like structure, a pair of upright, transversely spaced harvesting mechanisms extending downwardly from the box-like structure and defining a plant passage therebetween for receiving one of the adjacent inboard rows, and fore-and-aft extending bottom frame structure located below the harvesting mechanisms;

first and second outboard harvesting units, each including an upright housing assembly defining a fore-and-aft plant passage and harvesting mechanisms supported in the housing assembly;

means for cantilevering the first and second outboard units from the first and second inboard units, respectively, with the corresponding plant passages aligned with the outboard rows; and wherein the means for transversely cantilevering include means for transversely positioning each outboard unit with respect to the adjacent inboard unit to accommodate different row spacings.

10. The harvester as set forth in claim 9 wherein the first and second outboard units also include upper box-like structure, and wherein the means for transversely cantilevering the outboard units from the inboard units comprise a pair of telescoping cross members connected between the box-like structure on adjacent inboard and outboard units.

11. The harvester as set forth in claim 10 wherein the outboard units include bottom frame structure and wherein the means for transversely cantilevering the outboard units further comprises a lower tie plate connected between the bottom frame structures.

12. The harvester set forth in claim 11 further comprising means for strengthening the outboard units in the fore-and-aft direction, said means for strengthening the outboard units comprising an elongated brace connected at one end to the upper box-like structure of the outer unit and angling downwardly and forwardly therefrom and connected at its opposite end to the corresponding bottom frame structure.

13. A harvester for use in a field in which a crop is planted in spaced rows, comprising:

a frame member including an axle member having wheels for transporting the harvester over the field with the wheels being spaced to run between a first pair and a second pair of rows respectively;

first and second individual harvesting units supported forwardly of the main frame for relative vertical movement with respect thereto, each of said units having a crop-receiving opening for receiving a row of the crop as the harvester is transported over the field and means for harvesting the crop, the opening in the first unit accommodating the inner row of the first pair of rows and the opening in the second unit accommodating the inner row of the second pair of rows;

third and a fourth individual harvesting units outwardly cantilevered from the first and second units, respectively, each extending outwardly beyond the corresponding wheel, and each having a crop-receiving opening and means for harvesting the crop, the opening in the third unit accommodating the outer row of the first pair of rows and the opening in the fourth unit accommodating the outer row of the second pair of rows.

14. The harvester as set forth in claim 13 wherein the first and second harvesting units each include an upper box-like structure having an outboard side extending generally in the fore-and-aft direction and wherein the third and fourth units include an upper box-like structure having an inboard side extending generally parallel to the outboard side of the adjacent unit, the harvester further comprising an adjustable support member extending transversely between the inboard and outboard sides and connected to the upper box-like structures of the adjacent units.

15. The harvester as set forth in claim 14 including a plurality of adjustable support members connected between the box-like structures of the first and third units, and the second and the fourth units, respectively, and wherein the third and fourth units also include fore-and-aft extending lower frames supported below the upper box-like structures and means for transferring fore-and-aft loading on the lower frames to the upper box-like structure of the units.

16. The harvester as set forth in claim 14 further comprising a telescoping transverse shaft assembly operably connecting the means for harvesting on the adjacent units.

17. The harvester as set forth in claim 15 wherein the means for transferring fore-and-aft loading comprises a brace connected at one end near the front of the lower frame and at the opposite end to the box-like structure of the corresponding unit.

18. The harvester as set forth in claims 13 or 14 further comprising means for independently moving the first and second units vertically.

19. The harvester as set forth in claim 13 further comprising first and second pairs of transversely spaced arm members for independently supporting the first and second harvesting units, respectively, and means for preloading the outermost arm of each pair upwardly with respect to the innermost arm of the corresponding pair and maintaining the third and fourth units level with the first and second units, respectively.

20. A cotton harvester for simultaneously harvesting cotton from four parallel rows of cotton plants, comprising:

a fore-and-aft extending harvester frame supported near its forward end by first and second transversely spaced ground wheels;

transverse rockshaft means supported near the forward end of the frame;

first and second pairs of transversely spaced lift arms operably connected to and extending forwardly from the rockshaft means;

two inner harvesting units supported forwardly of and for relative vertical movement with respect to the frame by the first and second pairs of lift arms, respectfully, the units including crop receiving openings for receiving the two innermost rows of cotton;

means extending rearwardly from the inner harvesting units to the frame for stabilizing said units; and two outer harvesting units transversely cantilevered from the respective inner harvesting units and including crop receiving openings for receiving the two outermost rows of cotton.

21. The harvester as set forth in claim 20 wherein the outermost lift arm of each of the pairs of transversely spaced lift arms is angled upwardly with respect to the adjacent inner lift arm.

22. The harvester as set forth in claims 20 or 21 wherein the outer harvesting units include an upper box-like structure and a lower frame supported below the box-like structure, the outer harvesting units further comprising means for transferring fore-and-aft loading from the lower frame to the box-like structure.

23. A cotton harvester for simultaneously harvesting cotton from four parallel rows of cotton plants, comprising:

a harvester frame supported near its forward end by a pair of transversely spaced drive wheels;

first and second axially aligned rockshafts supported near the forward end of the harvester frame;

first and second arm members transversely spaced on the first and second rockshafts, respectfully, and extending forwardly therefrom;

means for independently rocking the rockshafts;

a pair of framed inner housing members supported for relative vertical movement with respect to the harvester frame forwardly of and generally between the wheels by the first and second arm members, respectively, the housing members including inwardly and outwardly facing sidewalls, and forwardly facing crop receiving openings located between the sidewalls for receiving two of the rows of cotton plants between the drive wheels;

support members connected to the inner housing member frames and extending outwardly from the outwardly facing sidewalls;

a pair of framed outer housing members connected to and supported by the support members in a cantilevered fashion generally outwardly of the respective wheels and adjacent the respective inner housing members, the outer housing members including forward crop receiving openings for receiving two rows of cotton plants outwardly of the drive wheels; and means associated with the housing members for removing cotton from the plants.

24. The harvester as set forth in claim 23 wherein the support members comprise telescoping beam members having one end connected to the inner housing frame and the opposite end connected to the corresponding outer housing frame.

25. The harvester as set forth in claims 23 or 24 wherein the inner housing members include top and bottom portions connected between the sidewalls, and wherein the arm members are pivotally connected to the inner housing members adjacent the connections between the top portions and the sidewalls, the harvester further comprising means extending forwardly from the harvester frame to the bottom portions of the inner housing members for maintaining the inner and outer housing members at a preselected front to rear slope.

26. A cotton harvester for simultaneously harvesting four parallel rows of cotton comprising:

a fore-and-aft extending main frame supported near its forward end by a pair of drive wheels transversely spaced to accommodate two rows of cotton therebetween with the two outermost rows of cotton outwardly of the wheels;

a lift assembly connected to, and including a pair of rockable arm members extending forwardly from the frame, and means for rocking the arm members in a generally vertical plane;

a pair of upright inner harvesting units depending from the respective arm members for vertical movement therewith, said inner units including a frame, an inwardly and outwardly facing side wall, a forward crop receiving opening, a plant passage extending rearwardly from the crop receiving opening for receiving one of the rows of cotton between the drive wheels, and a harvesting mechanism for removing cotton from the row;

a pair of upright outer harvesting units including a frame, inwardly and outwardly facing side walls, a forward crop receiving opening, a plant passage extending rearwardly from the crop receiving opening, and a harvesting mechanism;

means for transversely cantilevering the outer harvesting units from the inner harvesting units, including means for selectively positioning the outer unit with respect to the adjacent inner unit with the outer unit crop receiving opening in alignment with one of the two outermost rows of cotton; and said means for transversely cantilevering comprising an elongated transversely extending support member connected at one end to the inner unit frame and extending outwardly beyond the side wall thereof, said support member connected at its opposite end to the frame of the corresponding outer unit.

27. The cotton harvester as set forth in claim 26 further comprising first and second transversely extending tubular members connected to the inner and outer unit frames, respectively, said transversely extending support members being supported in and transversely adjustable with respect to the tubular members for adjusting the outer unit with respect to the adjacent inner unit.

28. The cotton harvester as set forth in claim 27 wherein the inner and outer harvesting unit frames include a stiffener extending in the fore-and-aft direction between the side walls, and wherein the first and second tubular members are connected to the stiffeners.

29. A cotton picking attachment for use with a vehicle adopted for transportation to and movement through a field in which cotton is planted in conventional parallel rows, the distance between the rows varying from field to field, wherein the vehicle has a longitudinal mobile frame supported by transversely spaced drive wheels for propelling the vehicle forwardly through the field, the wheels being spaced apart to run between rows inwardly of and rows outwardly of the wheels, the attachment comprising:

a first unit housing mounted on the frame forwardly and inwardly of one of the wheels and defining a first fore-and-aft extending plant passage for receiving the row inwardly of said wheel;

a second unit housing defining a second fore-and-aft extending plant passage;

means extending outwardly from the first unit housing for adjustably and transversely cantilevering the second unit housing therefrom outwardly of said wheel with the second fore-and-aft extending plant passage receiving the row outwardly of said wheel, wherein the second unit housing is transversely adjustable with respect to first unit to accommodate different row spacings; and picking elements located in the unit housings and extendable into the plant passages to pick cotton from the rows.

30. The cotton picking attachment as set forth in claim 29 wherein two pairs of first and second unit housings are transversely aligned across the front of the frame for simultaneously harvesting two rows of cotton between the wheels and two rows outside the wheels.

31. The cotton picking attachment as set forth in claims 29 or 30 wherein the second unit housing is selectively detachable from the first unit housing so that the forward end of the vehicle may be narrowed during transportation.

32. A cotton harvester for use in a field with parallel rows of cotton plants, comprising:

a main frame;

a pair of frame-carrying wheels spaced for embracing two adjacent rows;

a pair of inner harvesting units carried forwardly on the frame between the wheels, each unit having a plant-receiving opening for receiving one of the adjacent rows and means for removing the cotton from the row;

an outboard harvesting unit;

means for supporting the outboard unit is side-by-side relation to one of the inner units and for adjusting the side-by-side inner and outboard units transversely with respect to each other, the outboard harvesting unit including a plant-receiving opening for receiving a third row of cotton immediately outwardly of the two adjacent rows and means for removing cotton from the third row;

the side-by-side inner and outboard units including a pair of adjacent rear cotton discharge openings, the spacing between the discharge openings being variable as the side-by-side units are adjusted transversely with respect to each other;

an upright common discharge structure supported by one of the side-by-side units and opening into the adjacent rear discharge openings to receive removed cotton therethrough;

a cotton-conveying duct connected to the discharge structure; and means for directing the cotton through the openings and into the discharge structure regardless of the relative transverse adjustment of the side-by-side inner and outboard units.

33. The harvester as set forth in claim 32 wherein the outboard harvesting unit is transversely cantilevered from the adjacent inner unit.

34. The harvester as set forth in claims 32 or 33 further comprising means for supporting the discharge structure solely from the inner harvesting unit adjacent the outboard harvesting unit.

35. The harvester as set forth in claims 32 or 33 wherein the means for directing the cotton through the openings and into the discharge structure comprises an upright baffle plate extending rearwardly from the outboard unit to the discharge structure, and rockable about a generally vertical axis to accommodate changes in the spacing between the openings.

36. The harvester as set forth in claims 32 or 33 wherein the discharge structure includes an upright divider panel extending forwardly between the openings to prevent cotton from one of the openings from being discharged toward the other opening.

37. The harvester as set forth in claims 32 or 33 wherein the means for removing the cotton from the rows for the side-by-side inner and outboard units comprise a pair of adjacent forward high volume picker drums, one for each unit, and a doffer located rearwardly of each drum and forwardly of the corresponding discharge opening.

38. The harvester as set forth in claims 32 or 33 wherein the side-by-side inner and outboard harvesting units define an accommodation space rearwardly of the discharge openings and forwardly of one of the frame-carrying wheels, and wherein the discharge structure is supported within the accommodation space forwardly of the wheel.

39. The harvester as set forth in claims 32 or 33 wherein the discharge structure comprises a pair of transversely spaced side walls having upright forward edge portions, a rear panel connected between the side walls and defining a forwardly opening channel-shaped member with a lower rear opening, a generally horizontal bottom portion connected between the side walls, a discharge duct extending upwardly from the lower rear opening adjacent the rear panel and connected to the cotton-conveying duct, and means for releasably attaching the discharge structure to the unit with the forwardly opening channel-shaped member opening into the discharge openings.

40. The harvester as set forth in claim 39 wherein the discharge duct is angled upwardly and outwardly from the lower rear opening and terminates in a duct connecting portion offset toward the outboard unit side of the pair of inner and outboard units, and wherein the cotton-conveying duct is connected to the duct connecting portion and extends generally upwardly and rearwardly therefrom.

41. A cotton harvester for use in a field with parallel rows of cotton comprising:

a main frame;

a pair of transversely spaced wheels mounted on and supporting the main frame;

at least one inner harvesting unit mounted forwardly of and generally between the wheels, the inner unit having a crop opening for receiving a first row of cotton;

an outer unit transversely cantilevered from the inner unit and including a crop opening for receiving a row of cotton adjacent the first row, each unit including means for harvesting the cotton from the respective row and defining a rear discharge opening, and further including means for directing the harvested cotton rearwardly through the discharge opening;

a discharge structure connected to one of the units and including upright fore-and-aft side walls located outwardly of each discharge opening, a rear panel spaced rearwardly of and generally closing the discharge openings, the panel connected between the side walls and defining a lower rear opening in the discharge structure; and a single discharge duct extending upwardly from the lower rear opening.

42. The harvester as set forth in claim 41 further comprising means for transversely adjusting the outer unit with respect to inner unit to accommodate changes in spacing between the parallel rows of cotton, and wherein the harvesting units further include an upright baffle rockably connected about a generally vertical pivot to, and extending rearwardly from one of the units to the corresponding side wall of the discharge structure, said baffle generally defining one side of the corresponding discharge opening and rockable to accommodate relative changes in position between the harvesting unit and the discharge structure as the units are transversely adjusted with respect to each other.

43. The harvester as set forth in claims 41 or 42 wherein the discharge structure is supported entirely from the inner harvesting unit.

44. The harvester as set forth in claim 42 wherein the discharge structure is connected to the inner harvesting unit and the upright baffle is connected to the outer harvesting unit.

45. The harvester as set forth in claims 42 or 44 wherein the upright baffle includes an upright channel shaped edge, and wherein the channel shaped edge receives the corresponding upright side wall of the discharge structure.

46. In a cotton harvester having a tractor vehicle and four units for harvesting cotton from four adjacent rows of cotton and in which two inner units are positioned to harvest cotton from the two inner rows of said four rows and two outer units are positioned to harvest cotton from the two outer rows of said four rows of cotton and in which alternate units are substantially identical to one another, said inner units further having forward harvesting mechanisms outboard of their respective rows and rear harvesting mechanisms inboard of their respective rows, and said outer units having forward harvesting mechanisms inboard respectively of said outer rows and rear harvesting units outboard, respectively of said outer rows, and each of said units having a housing structure composed of inner and outer upright compartments spaced transversely apart to define a plant passage through which the respective row may pass and for housing the inner and outer harvesting mechanisms respectively, said housing structure further having an upper horizontal compartment extending over and connected to the inner and outer compartments at their upper extremities and overlying said passage, and said upper compartment having upper and lower horizontal walls extending between and rigidly fixed to upper and lower edges of vertical walls, said upper compartment further having fixed thereto a diagonally extending horizontal drive housing formed of interconnected vertical and horizontal panels and overlying and extending between the inner and outer harvesting mechanisms and affording both transverse and fore-and-aft rigidity to the upper compartment; power lift means on the tractor vehicle for raising and lowering said inner units; means for cantilevering each outer unit on a respective inner unit, said means including at least in part a front and rear transverse beam structure extending between the upper compartments of the adjacent inner and outer units and having at least portions of each fixed to the respective inner and outer units.

47. In a cotton harvester having a tractor vehicle for harvesting cotton from four adjacent rows of cotton and in which two inner units are positioned to harvest cotton from the two inner rows of said four rows and two outer units are positioned to harvest cotton from the two outer rows of said four rows of cotton and in which alternte units are substantially identical to one another, and each of said units having a housing structure composed of inner and outer upright compartments spaced transversely apart to define a plant passage through which the respective row may pass and for housing inner and outer harvesting mechanisms respectively, said housing structure further having an upper horizontal compartment extending over the passage and connected to the inner and outer compartments at their upper extremities, and said upper compartment having upper and lower horizontal walls extending between and rigidly fixed to upper and lower edges of vertical walls, said upper compartment further having fixed thereto a diagonally extending horizontal drive housing formed of vertical and horizontal panels and overlying and extending between the harvesting mechanisms of the respective upright compartments and affording both transverse and fore-and-aft rigidity to the upper compartment; power lift means on the tractor vehicle for raising and lowering said inner units; means including a front and rear transverse beam structure extending between the upper compartments of the adjacent inner and outer units and having at least portions of each fixed to the respective diagonally extending drive housings of the respective inner and outer units for cantilevering said outer units on said inner units.

48. In a cotton harvester having a tractor vehicle for harvesting cotton from four adjacent rows of cotton and in which two inner units are positioned to harvest cotton from the two inner rows of said four rows and two outer units are positioned to harvest cotton from the two outer rows of said four rows of cotton, and each of said units having a housing structure composed of inner and outer upright compartments spaced transversely apart to define a plant passage through which the respective row may pass and for housing the inner and outer harvesting mechanisms respectively, said housing structure further having an upper horizontally extending compartment extending over the passage and connected to the inner and outer compartments at their upper extremities and overlying said passage, and said upper compartment having upper and lower horizontal walls extending between and rigidly fixed to upper and lower edges of vertical walls to form channel-like structures, said upper compartment further having fixed thereto a diagonally extending horizontal drive housing formed of interconnected vertical and horizontal panels and overlying and extending between the harvesting mechanisms of the respective upright compartments and affording both transverse and fore-and-aft rigidity to the upper compartment; power lift means on the tractor vehicle for raising and lowering said inner units; adjustable tie means including transverse beam structures extending between the upper compartments of the adjacent inner and outer units and having at least portions of each fixed to the respective diagonally extending drive housings of the respective inner and outer units for suspending said outer units on said inner units in transversely adjustable manner and for vertically adjusting the outer units in unison with the inner units.

49. The invention described in claim 48 in which each of the transverse beam structures include a transversely extending beam fixedly attached to one of the inner and outer units and a tube like beam-receiving structure fixed to the other of said units for adjustably receiving the respective transverse beam, and a locking means for fixing said beam in the beam receiving structure at a plurality of transverse positions whereby said inner and outer units may be adjusted in accordance with row spacing of the cotton plants.

50. The invention described in claim 48 in which the diagonal drive housings of adjacent inner and outer units converge forwardly with respect to one another, the transverse beam structures are spaced fore-and-aft and extend between and are fixed to forward portions and rear portions of the diagonal housings.

51. The invention described in claim 48 in which the diagonal drive housings of adjacent inner and outer units converge forwardly with respect to one another, and further characterized by structural links on each outer compartment of each outer unit extending downwardly and forwardly from upper ends fixed to a rear portion of the respective diagonal housing to forward ends fixed to the front lower extremity of the respective compartment of said outer unit.

* * * * *

UNITED STATES PATENT OFFICE
CERTIFICATE OF CORRECTION

Patent No. 4,249,365          Dated 10 February 1981

Inventor(s) Arthur L. Hubbard, Russel D. Copley and Merle D. Nieman

It is certified that error appears in the above-identified patent and that said Letters Patent are hereby corrected as shown below:

Column 19, line 9, delete "is" and insert -- in --.

Column 21, line 45, delete "alternte" and insert -- alternate --.

Signed and Sealed this

Fifth Day of May 1981

[SEAL]

Attest:

RENE D. TEGTMEYER

*Attesting Officer*      *Acting Commissioner of Patents and Trademarks*